(12) United States Patent
Proharam (10) Patent No.: US 10,306,879 B2
(45) Date of Patent: Jun. 4, 2019

(54) DEVICE FOR SPRAYING METERED AMOUNTS OF VARIOUS AQUEOUS SOLUTIONS CONTAINING A PLURALITY OF ADDITIVES

(71) Applicant: René Proharam, Lacommande (FR)

(72) Inventor: René Proharam, Lacommande (FR)

( * ) Notice: Subject to any disclaimer, the term of this patent is extended or adjusted under 35 U.S.C. 154(b) by 0 days.

(21) Appl. No.: 15/551,387

(22) PCT Filed: Feb. 19, 2016

(86) PCT No.: PCT/FR2016/050392
§ 371 (c)(1),
(2) Date: Aug. 16, 2017

(87) PCT Pub. No.: WO2016/132085
PCT Pub. Date: Aug. 25, 2016

(65) Prior Publication Data
US 2018/0042215 A1    Feb. 15, 2018

(30) Foreign Application Priority Data

Feb. 20, 2015 (FR) .................................... 15 51494
Oct. 12, 2015 (FR) .................................... 15 02156

(51) Int. Cl.
*A01M 7/00* (2006.01)
*A01C 23/04* (2006.01)
*B05C 17/005* (2006.01)

(52) U.S. Cl.
CPC ......... *A01M 7/0092* (2013.01); *A01C 23/042* (2013.01); *B05C 17/00553* (2013.01)

(58) Field of Classification Search
CPC ............... A01M 7/0092; A01C 23/042; B05C 17/00553
(Continued)

(56) References Cited

U.S. PATENT DOCUMENTS 3,976,087 A * 8/1976 Bolton ................ A01M 7/0092
137/15.01
4,121,767 A * 10/1978 Jensen ................ A01M 7/0092
137/92
(Continued)

FOREIGN PATENT DOCUMENTS

| EP | 0527027 A1 | 2/1993 |
| EP | 1378293 A1 | 1/2004 |
| WO | 2014/200896 A1 | 12/2014 |

OTHER PUBLICATIONS

International Search Report, Application No. PCT/FR2016/050392, dated Jun. 22, 2016.

*Primary Examiner* — Chee-Chong Lee
(74) *Attorney, Agent, or Firm* — Steven M. Shape; Dennemeyer & Associates, LLC (57) ABSTRACT

The invention relates to a device for preparing aqueous solutions intended to be sprayed via a manifold including two or more nozzle sections, on a surface from a mixture of water and two or more additives. Said device includes: —a water vessel (2); —a pump (6) connected to each section (4, 5); —a first pipe (8) connecting the water vessel (2) to the pump (6); —a second pipe (9) with as many parallel arms between the pump (6) and each section (4, 5); —at least two additive vessels (10, 11); and—a means (12) for metering the amount of each additive that is to be injected into the second pipe (9) and mixed with the water.

12 Claims, 3 Drawing Sheets

(58) Field of Classification Search
USPC .......................................................... 239/159
See application file for complete search history.

(56) References Cited

U.S. PATENT DOCUMENTS

| | | | |
|---|---|---|---|
| 4,697,739 A | | 10/1987 | McCracken et al. |
| 4,714,196 A | * | 12/1987 | McEachern ............... B05B 9/06 |
| | | | 239/127 |
| 4,768,712 A | * | 9/1988 | Terrell .................. A01C 23/042 |
| | | | 137/624.12 |
| 4,867,192 A | * | 9/1989 | Terrell .................. A01C 23/042 |
| | | | 137/93 |
| 5,203,504 A | * | 4/1993 | Frost .................... A01C 23/042 |
| | | | 239/10 |
| 2011/0174893 A1 | | 7/2011 | Allan et al. |

* cited by examiner

DEVICE FOR SPRAYING METERED AMOUNTS OF VARIOUS AQUEOUS SOLUTIONS CONTAINING A PLURALITY OF ADDITIVES

The present invention relates to a spraying device using a set of nozzles arranged on a boom, in order to spread on a surface, such as a soil for cultivation, simultaneously or alternatively, various aqueous solutions comprising one or more additional products.

More particularly, the invention will be described in relation to a spraying system using a set of nozzles arranged aligned on a boom mounted upstream or downstream of an agricultural vehicle, such as a tractor.

In the agricultural sector, it is common to spread products on the soil, including phytosanitary products, fertilizers, insecticides, herbicides, or any other product intended to treat the soil or to improve the growth of crops.

The final aqueous solution, intended to be sprayed for spreading on the soil, thus comprises, on the one hand, a part of water or the like, and on the other hand, two, three or more different additive products. Since these products are different, they must be incorporated into the final solution with different dosages.

On a same given surface, intended for cultivation, the need for treatment may be heterogeneous and require spraying of different treatments, therefore of different aqueous solutions in some parts. This need for different treatments can be illustrated by one of the treatments carried out on vines where one of the products will be applied onto the bunch of grapes and the one or more other products will be applied onto the foliage. Likewise, it can be illustrated by the herbicidal treatment of an agricultural surface with respect to only few scattered adventive plants.

The efficiency of a treatment of a cultivated surface results from the amount of spread product contained in the aqueous solution, as well as the amount of droplets of this aqueous solution which will reach its target. Products are usually metered in liters per hectare (L/ha).

Spraying systems are generally motorized or towed or carried by agricultural machines such as tractors, the ground speed of which fluctuates depending on the nature of the terrain, the slope or any other reason.

In order to uniformly spread an amount of product per hectare while the ground speed fluctuates, it is necessary that the flow rate of the spread product, and therefore of the aqueous solution, be varied proportionally. The nozzles of the spray boom, the role of which consists in projecting droplets of aqueous solution at a given speed, usually expressed in pressure (bars), take on part of this flow rate variation and usually the nozzles are adapted to the ground speed or the ground speed is adapted to the nozzle set when possible.

In a known manner, as illustrated by European patent number 1184085, this device comprises a main tank forming a water reserve and connected to a pump by a pipe. The pump is connected to the spray nozzle boom. Injectors are connected between the pump and the water tank, namely an injector connected to each additive product tank so as to inject into the pipe the required metered amount of the product of the corresponding additive tank.

In another type of known system, each additive product tank is associated with a diaphragm pump or a piston pump, each injecting into the pipe connecting the spray pump to the spreading boom the metered amount of products from the corresponding tank.

While these devices are satisfactory for common uses, they have limitations, especially when it comes to the dosage concentration range of the additive products to be added in order to obtain the appropriate mixture. For example, the pumps of the above-mentioned known system have a concentration range between 0.028 L/min and 1.13 L/min.

In addition, injector or pump systems have an accuracy that is not satisfactory and varies with the viscosity, the temperature or even the heterogeneity of the additive product. The user is therefore forced to perform permanent calibrations.

In addition, the reliability of the metering pumps and the precision flow meters which control the volumes of additive products is affected by the corrosiveness of some of these additive products and by the abrasive particles they may contain.

Furthermore, for very low speeds of the tractor, the dosage must itself be greatly reduced to a value sometimes lower than the minimum operation threshold, in terms of flow rate, of the pump or of the injector for known systems.

These difficulties peak at the boundary or the edge of the land where the spreading is done, since the tractor must then gradually slow down as it approaches said boundary, until it stops to turn or turn around, to resume spreading as quickly as possible at cruising speed. This is often achieved by using only part of the booms, the other part being outside the boundaries of the land or on an already treated part. This amplifies the phenomenon of decreased additive product flow rate.

The known systems, by virtue of the above-mentioned limits, lead to product concentrations that are much higher than required in the areas bordering the crop field edges.

Finally, the technique known for spreading different products, alternately or simultaneously, on the treated surface, consists in preparing various aqueous solutions in various tanks and to direct this solution onto the booms. This can only be achieved for 2 different solutions since 3 or more solutions would be too heavy to materially implement.

Furthermore, this technique is relatively constraining since the solution of each tank is fixed when preparing the treatment, allowing the dosage to be modulated only for all the products of the prepared solution and not for one of the additives with respect to the other. In addition, since the surface treated with either one of the aqueous solutions is not or cannot be precisely defined, residues of unused product remain at the end of the treatment, residues which will have to be managed and eliminated.

The known systems for preparing metered amounts as the treatment is carried out cannot be used in this case because they use a buffer tank for homogenizing the prepared solution which influences the reaction time for switching between two different aqueous solutions.

For example, the first-mentioned injector device has a reaction time of several tens of seconds, which requires an anticipation of several hundred meters in the common case of treatments carried out between 10 and 20 km/h.

It is an object of the present invention to overcome these disadvantages, and to reconcile these conditions, by providing a device for preparing one, two or more aqueous solutions incorporating two, three or more different additives, intended to be mixed with water at different dosages, and this with a very high precision on the one hand, and adapted to meter each product within a very wide dosage range, and especially within low dosage values, on the other hand.

Moreover, the system of the invention allows several solutions of additive products to be prepared and to virtually instantaneously switch from one solution to the other while metering is modulated.

Finally, the system of the invention modulates the dosage of the products depending on the ground speed while keeping the pressure at the nozzles constant, which considerably increases the spraying quality.

To this end, according to the invention, the device for preparing one, two or more aqueous solutions intended to be sprayed simultaneously or alternatively, using a spray nozzle boom comprised of several boom sections connected in series or in parallel, on a surface such as a cultivated soil, from a mixture of water and of two, three or more additive products, of the type comprising:

- a main water tank;
- a pump adapted to be connected to each section of the spray nozzle boom;
- a first pipe connecting the water tank to said pump;
- a second pipe dividing into as many parallel branches connecting the outlet of said pump to each boom section and provided at each branch with a check valve followed by an injection point;
- at least two additive product tanks;
- means for metering the amount of each additive product to be injected into the second pipe to be mixed with water, is characterized in that said means carry out successive batches of different premixtures of water and additive products, wherein each premixture corresponds to an amount of additive products, so that these premixtures may be different according to the sections in which they will be injected on the one hand, that they are dosage-modulated in order to obtain on each boom section an ad hoc concentration of additive products in accordance with the predetermined concentration on the other hand, and finally that, after the addition of water to the premixture, a constant spray pressure is obtained on each boom section.

Thus, metering is carried out in a very accurate manner, the spread mixtures can be different on each boom section, and each boom section spreads at a constant pressure an ad hoc concentration of additive products, which concentration is modulated depending on the ground speed of the sprayer in order to spread, as desired, liters/hectare of additive products while keeping the quality of the droplet jets constant at the nozzles.

According to another feature, the amount of additive products contained in a premixture batch corresponds exactly to the desired amount of additive products to be spread on a predefined surface unit on the one hand, and the overall volume of each premixture batch is constant, resulted from the addition of an additional volume of water to the volume of additive products introduced.

Preferably, the surface unit can be modified, and is between one and a few tens of ares, and more particularly, of the order of twenty ares.

According to a first embodiment, the means adapted to carry out the premixture successive batches include a dummy piston-type metering system comprised of:

- a chamber connected on the upstream side to one or more measuring flow meters on the one hand, and to a second water meter flow meter on the other hand, and on the downstream side to a third pipe for discharging the contents of the chamber on which there is a valve called the drain valve for the controlled discharge of the contents of the chamber;
- as many controlled valves as additive product tanks, connected at one end thereto and at the other end at an injection point located at the third pipe between the chamber and upstream of the drain valve;
- means for precisely controlling the amount of product entering the chamber comprised, for each measuring flow meter placed upstream of the chamber, in series, of a restriction limiting the flow rate in the measuring range of the flow meter to which it is associated, of a valve for obtaining the desired volume, and of a pipe connecting this valve to downstream of the drain valve;
- means for pressurizing the contents of the additive product tanks comprised of an air pump, of a pressure regulator and of three-way valves connected onto each additive product tank;
- means for discharging the contents of the chamber by a flow which is the reverse of that of its filling when measuring the additive products comprised, in series, of the water meter flow meter, of a restriction limiting the flow rate in the measuring range the flow meter, of a two-way valve and of a pipe connecting this valve to downstream of the water pump.

In another embodiment, the water meter flow meter is placed on the third pipe for discharging the contents of the chamber downstream of the rinsing valve.

Preferably, the chamber is sized so as to contain the sum of the amounts of additive products of the premixture.

Opening in turn the controlled valves of each additive product tank and of the valve associated with the selected measuring flow meter allows the chamber of the dummy piston to be filled and thus the volume of additive product entering the chamber to be very accurately measured.

When the amount of each additive product corresponding to the desired premixture has entered the chamber, the latter is emptied quickly with water from the water pump by opening the two-way valve placed upstream thereof. The amount of water added to constitute the premixture is measured by the water meter flow meter.

Thus, the measuring flow meters account for only one displacement of water, which allows one or more very accurate and low passage flow meters to be used for measuring the products while overcoming the physical characteristics of these products (viscosity, heterogeneity, corrosion, abrasion . . . ).

Another embodiment for the means adapted to carry out the premixture successive batches includes a stage syringe, comprising at least two chambers, and provided with a piston driven preferably by an electric motor.

It is provided:

- a fifth pipe bypassing the first pipe and connected to the outlet of the water tank;
- a two-way valve for each additive product tank connected at an injection point to the third pipe upstream of a discharge valve, and
- a three-way valve for water and the contents of the third pipe.

Each chamber of the syringe is connected to the fifth pipe or the third pipe via a three-way valve, a first way of which, which is also the common way of the valve, is connected to one of the chambers of the syringe, the second way is connected to an upstream part of the third pipe, the third way is connected to the downstream part of the fifth pipe.

Each two- or three-way valve allows the corresponding chamber to be filled, either with water or with the corresponding additive product. This switch allows a selected chamber to be filled with product while the other chambers are filled with water.

Consequently, the syringe draws each additive product, and the dimensions of each chamber of the syringe are calculated to ultimately achieve a premixture in accordance with the desired dosage for the corresponding product.

In another embodiment, the stages of the syringe are replaced by as many independent pistons driven by a motor.

Advantageously, the device comprises two, three or more buffer tanks adapted to each receive premixture successive batches, and the output of which is connected for each one to a pump and then to the injection points of the branches of the second pipe in order to be able to supply one or more boom sections with premixture.

Preferably, each buffer tank contains identical premixture batches and different premixture batches one from the other.

Upstream of the buffer tanks, a three-way valve in the case of two buffer tanks or a multiple-way valve in the case of several buffer tanks, directs the premixture batches constituted in one or the other buffer tank.

Each buffer tank is divided into two parts: an upper part receiving the premixture being constituted, a second part receiving the premixture once completely constituted. A two-way valve connects the upper part to the lower part of the buffer tank.

Each buffer tank outlet comprises means for regulating the flow rate of the premixture to be injected into the desired boom sections. Said means are successively comprised of a pump, a regulator, the returns of which are channeled to the lower part of the corresponding buffer tank in order to ensure mixing thereof, a check valve, a flow meter and a premixture outlet pipe.

The contents of each buffer tank is then directed and injected into the second pipe at each branch of each boom section and thereby reconstructs with the water from the pump the desired ad hoc mix at each boom section at a constant flow rate.

Advantageously, a multiplexer connects the premixture outlet pipes of the buffer tanks to the injection points of the branches of the second pipe going to the boom sections, and thereby directs, as desired, any premixture onto any boom section.

In a preferred embodiment, the means adapted to carry out the multiplexing when the device has two buffer tanks is a three-way valve per boom section which connects on one way the premixture outlet pipe of the first buffer tank, on the second way the premixture outlet pipe of the second buffer tank and on one of the boom sections, the third common way. More generally, in the case of three or more buffer tanks, a multi-way valve having the same number of ways plus one as the number of buffer tanks replaces said three-way valve.

Each three-way valve is connected to a mixer which receives, on the one hand, the premixture directed by the valve and, on the other hand, the water from the pump through the second pipe.

Each switching element of the multiplexer, as well as the junction points of the second pipe, are placed on the corresponding boom section, as close to the nozzles as possible, in order to accelerate the reaction time for switching the premixture from one to the other buffer tank.

In the preferred embodiment of a multiplexer with two buffer tanks described above, the three-way valve dedicated to the switch of a boom section will be placed as close to this section as possible and most often above it.

Advantageously, on the one hand, the flow rate of the pump at the outlet of each buffer tank is regulated depending on the sprayer ground speed and the number of sections connected by the switch of the multiplexer, and, on the other hand, the pressure of the water pump is regulated in order to ensure a constant pressure at the spray boom nozzles and correct the pressure variations due to the flow rate changes of the pumps at the outlet of the buffer tanks when the sprayer speed changes.

Thus, the pumps of the buffer tanks ensure the precise metering of the products injected onto the desired surface and the water pump ensures a constant pressure, thereby a constant droplet size at the boom nozzles.

The device of the invention allows the metered amount to be modulated in a field plot in which varying all the pulverized products is desired.

According to the prior art, the metered amount of the mixture contained in the sprayer tank is modulated by acting on the volume of mixture spread per hectare, by lowering or increasing the pressure at the booms.

Precisely, according to the prior art, the number and the size of the droplets charged with additive product at a given concentration are varied on the treated surface.

This has two damaging consequences:
the risk of causing a highly volatile mist when the amount of product must increase;
the jet at the nozzles no longer covers the surface when it is desired to spread less product.

The invention overcomes these disadvantages and allows the amount of pulverized product to be drastically reduced or increased.

Mixing water with an amount of additive product by adjusting its flow rate in order to obtain a defined quantity per hectare while keeping the pressure at the booms constant, amounts to varying the amount of additive product in the sprayed droplets.

Likewise, being able to continuously prepare different batches of additive products in each buffer tank and to direct their contents on to one or the other boom section allows the user, for example for vines, to treat the foliage with a set of products and for example only the bunch of grapes with other products. Likewise, it allows the farmer, for example, to treat his field plot with one set of products and instantaneously spray other products only on unwanted adventive plant spots as he passes over them (e.g. spot of thistles in the middle of the field). This system provides a solution to the current challenge of decreasing entrants into the field plots demanded by the Grenelle de l'environnement.

The fact that all the premixture batches have a constant volume offers the advantage of minimizing the pressure variations at the booms when switching the multiplexers.

The present invention is now described using three illustrative examples not limiting the scope of the invention, and three accompanying figures, showing schematic diagrams of the device of the invention.

In the following description, the terms "height", "width", the qualifiers "horizontal", "vertical", "top/up" and "bottom/low" of an element, are used in the context of a normal installation of the device, namely relative to a vertical concept with respect to a horizontal plane. Likewise, the terms "upstream", "downstream", "distal" and "proximal" refer to the direction of the fluid flow.

Figure 1:
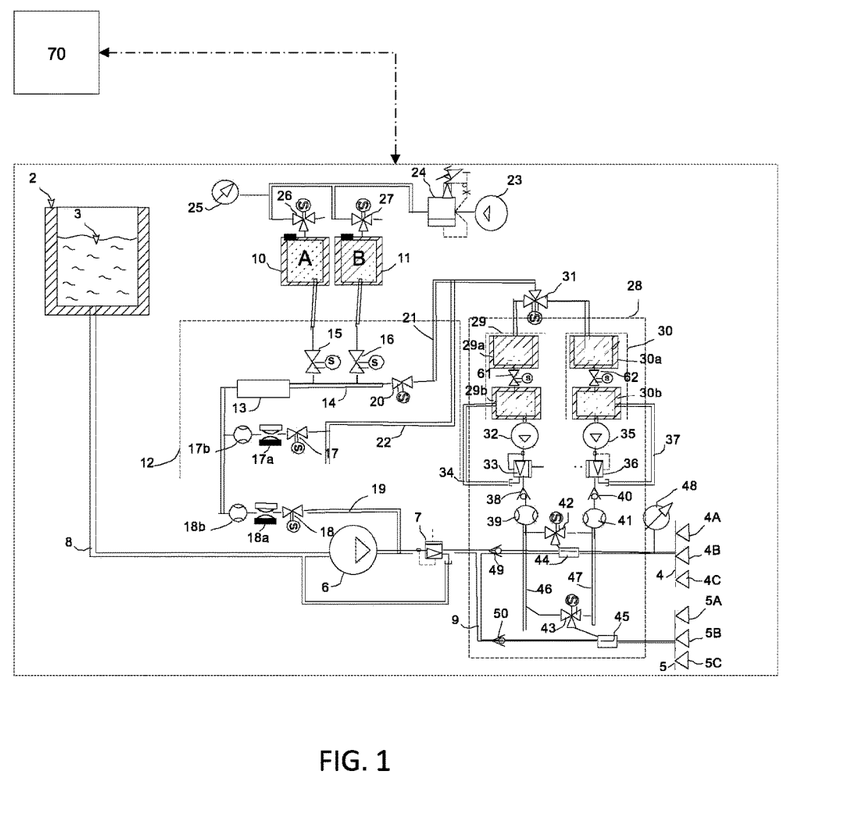
FIG. 1 shows a diagram of a first preferred embodiment of the invention, using means called "dummy piston"

The device 1, according to the example shown in FIG. 1, comprises:

a main tank 2 forming a water tank 3;

boom sections 4 and 5 of one or more spraying nozzles 4A to 4C and 5A to 5C known per se (only 2 boom sections with 3 nozzles are shown in the diagram for the sake of clarity); the boom sections are of a type known per se and may form a single boom or several parallel booms of a length between 4 and 50 m and may comprise between 1 and 8 nozzles;

a pump 6 and a pressure regulator 7, the return of which returns upstream of the pump 6 or in another embodiment, in the main tank 2;

a first pipe 8 connecting the water tank 2 to the pump 6;

a second pipe 9 dividing into several branches in order to connect the pump 6 to the different boom sections 4 and 5 and comprising, in each branch, a non-return valve 49 and 50, respectively, and then an injection point 44 and 45, respectively;

two tanks 10 and 11 each containing different additive products. It is possible to provide three, four or more tanks of additive products.

Means 12, called dummy piston-type metering system, allow the amount of each additive product to be metered and them to be mixed with water in order to form a premixture. For the sake of clarity of the figure, only 2 tanks of additive products and a single flow meter are shown. These means include:

a chamber 13 connected on the upstream side to one or more measuring flow meters 17b on the one hand, and to a water meter flow meter 18b on the other hand, and on the downstream side to a third pipe 14 for discharging the contents of the chamber on which there is a valve called the drain valve 20 for the controlled discharge of the contents of the chamber;

additive product tanks 10 and 11 connected in parallel, each to a controlled valve 15 and 16 connected at an injection point to the third pipe 14 between chamber 13 and upstream of the drain valve 20;

means for precisely controlling the amount of product entering the chamber comprised, for each measuring flow meter 17b placed upstream of the chamber, in series, of a restriction 17a limiting the flow rate in the measuring range of the flow meter to which it is associated, of a valve 17 for obtaining the desired volume, and of a pipe 22 connecting this valve to downstream of the drain valve 20;

means for pressurizing the contents of the additive product tanks comprised of an air pump 23, of a pressure regulator 24 and of three-way valves 26 and 27 connected onto each additive product tank 10 and 11, respectively;

means for discharging the contents of the chamber by a flow which is the reverse of that of its filling when measuring the additive products comprised, in series, of the water meter flow meter 18b, of a restriction 18a limiting the flow rate in the measuring range of the flow meter 18b, of a two-way valve 18 and of a pipe 19 connecting this valve 18 to downstream of the water pump 6.

Means allow, in the tanks 10 and 11, a pressure sufficient to push the additive products into the metering chamber when the valves 15 and 16 are open, to be established.

These means are comprised of:
an air pump 23;
a regulator 24 and a manometer 25 for controlling the pressure of the pump 23;
3-way valves 26 and 27 connected, as for the first way, to the additive product tanks 10 and 11, for the second way to the outlet of the regulator 24 and for the last way to the atmospheric pressure.

These valves allow a controlled pressure to be established in each tank and then to degasify by returning to atmospheric pressure when spraying is completed or the user wishes to add more additive product into the tank.

Means 28 allow the premixture batches formed by the means 12 to be directed and injected into the pipe 9 while modulating the dosage thereof, and this in order to be mixed with water therein and to constitute the ad hoc mixture for spraying at the nozzles of each sub-section 4 and 5.

These means include:

two buffer tanks 29 and 30 containing premixture batches with different dosages of additive products A and B. For example, it is possible to imagine that the tank 29 contains only product A and that the tank 30 contains only product B or any other combination of products. It is possible to provide three, four or more buffer tanks which will allow different and more varied combinations of additives products to be applied to each boom section;

a multi-way valve 31, the common way of which is connected to the pipe 21, wherein each of the other ways being connected to each buffer tank 29 and 30 directs the premixture batches into the desired buffer tank;

each buffer tank 29 and 30 is divided into two parts: an upper part 29a and 30a receiving the premixture being constituted, a second part 29b and 30b receiving the premixture once completely constituted. A two-way valve 61 and 62 connects the upper part to the lower part of the respective buffer tanks;

two pumps 32 and 35 are connected upstream, at the bottom of each buffer tank 29 and 30, respectively, and downstream, to a flow-controlled regulator 33 and 36, respectively, the returns 34 and 37 of which are channeled at the lower part of the respective buffer tanks for mixing and homogenizing the premixture batches contained in these tanks;

two pipes 46 and 47 connected to downstream of the regulators 33 and 36, respectively, bring the premixtures as close to the boom sections 4 and 5, respectively, as possible;

two flow meters 39 and 41 and two non-return valves 38 and 40 placed on each pipe 46 and 47 precisely control the injection flow rate of the premixtures;

a multiplexing means of the multi-way valve-type 42 and 43, each way of which is connected to each pipe 46 and 47 and the common way of which is connected to the injection points 44 and 45 of the boom sections, for the valve 42 to the injection point 44 and for the valve 43 to the injection point 45, respectively, allows the premixtures to be directed onto the desired sections. The number of multi-way valves is equal to the number of boom sections into which the user wishes to inject mixtures of different additive products;

the injection junction 44 and 45, provided with a dynamic mixer known per se, receives, on the one hand, the outlet of the common way of the valves 42 and 43, respectively, and, on the other hand, one of the branches of the pipe 9. The downstream side of the mixers is connected to each boom section 4 and 5, respectively. The premixture is thereby mixed with water and a homogeneous mixture is directed at the spray nozzles;

a manometer 48 placed on a boom section monitors the pressure and therefore the flow rate at this boom section 4. Since the nozzles are identical on all the sections and the pipes of each section have the same pressure drops, controlling the pressure given by this manometer 48 allows the desired mixture to be uniformly sprayed.

The regulators 7, 24, 33, 36, and the valves 15, 16, 18, 20, 26, 27, 31, 32, 35 are connected to a control console, 70, and which includes means for actuating and controlling these elements, depending on the required parameters, given by the flow meters 17, 21, 39, 41, the manometers 25, 48, but also by the data of sensors external to the device or given by the user. These parameters include, inter alia:

The speed of the tractor;

The nature and topography of the land where spreading is to be carried out;

The dosage of each additive product applied to each target field plot;

The mapping of the treated field plot and the geolocation of the sprayer and of each boom section;

The final water/additive products dosage at the outlet of the nozzles.

The operation of the device and the implementation of the process are as follows:

In the starting position, the chamber 13 is full of water, the additive product tanks 10 and 11 contain product A and B, respectively. All valves are controlled to be closed.

The tank 2 is filled with water, the valves 26 and 27 are oriented towards the atmospheric pressure.

A pressure of 1 to 2 bars is established in each tank by controlling the air regulator 24 by the pressure given by the manometer 25 and switching the valves 26 and 27.

The valve 31 is oriented towards the tank 29.

The valve 15 and then the valve 17 open, allowing the product A to enter the pipe 14 and the chamber 13. The water expelled from the chamber 13 goes through the flow meter 17b which measures very accurately the entering additive product volume. When the desired quantity of additive product is reached, the valve 17 and then the valve 15 close, and then the same operation is performed with the product B by opening and closing the valve 16 and then 17.

The chamber 13 is sized for containing the sum of the volumes of the thus entered products.

The valve 20 and then the valve 18 are then opened and the water propelled by the pump 6 enters the chamber 13, pushing the previously introduced products. The amount of water is precisely accounted for by the flow meter 18b. This water/product mixture forms a premixture.

When the premixture volume is reached, the valves 18, and then 20, close.

Thus, for a filling/discharge cycle, the measuring chamber is first filled with one or more additive products and then a given amount of water discharges these products to form an aqueous solution containing the predetermined ad hoc dosage of the corresponding product.

At the end of the cycle, in the example shown of two additive products A and B, the buffer tank 29 contains an aqueous solution which is comprised, on the one hand, of water and, on the other hand, of product of A and B corresponding to the required dosage for each product.

Advantageously, the amount of aqueous solution, created at each cycle, corresponds to the required amount of the corresponding product to treat a predetermined surface unit.

This surface unit is determined in advance by the system depending on the ground speed, the size of the boom and the number of sections connected by the valves 42 and 43, and the desired mixture flow rate. It is of the order of a few tens of ares, and preferably 20 ares.

Each cycle forms a premixture batch that is to be alternately introduced into the buffer tank 29, and then in the buffer tank 30 when the valve 31 is oriented towards it at the start of the cycle.

In the case of a batch preparation in the buffer tank 29, the valve 61 is closed. The preparation is carried out in the upper part 29a of the tank. When the cycle is completed, the valve 61 opens and the batch prepared in the upper portion is transferred into the lower part 29b of the buffer tank.

Preferably, the lower parts of the tanks will have a capacity of 2 premixture batches so that the computer managing the system can optimize the contents of the premixture available for treatment and more particularly for the end of the treatment and thereby maximize the remaining quantity.

When the buffer tanks 29 and 30 contain a premixture amount, spraying can begin. The switching valves 42 and 43 are arranged such that the premixture of each tank is directed onto one or the other boom section 4 or 5.

The pump 6 delivers at all boom sections a pressure measured by the manometer 8 and controlled by the regulator 7 depending on the type of nozzles used and the desired working pressure.

The pumps 32 and 35 deliver a flow rate measured by the flow meters 39 and 41 and controlled by the regulators 33 and 36. This flow rate is regulated depending on the ground speed of the tractor and the width formed by the boom sections connected onto the buffer tank.

The premixture of each buffer tank is directed by the valves 42 and 43 in the desired boom section and the final mixing is carried out in a dynamic mixer which ensures the homogeneity of the water from the pump 6 and of the premixtures from the buffer tanks 29 and 30.

When the sprayer speed varies, the premixture flow rate varies by influencing the pressure of the boom which is immediately compensated for by adjusting the pressure given by the regulator 7 of the pump 6.

Thus, the system performs a dose modulation of the injected product depending on the ground speed of the tractor while keeping a stable spray pressure at the nozzles.

Furthermore, resulted from the switch of the switching valves 42 and 43 and the proximity of the injection points 44 and 45 of the premixtures with respect to the nozzles 4 and 5, the system instantly switches from a type of dosage of additive produced to another dosage which may be entirely different. For example, the switching time on a section of 6 nozzles connected by a 4 mm diameter pipe and a closeness of 0.5 m from the injection point with respect to this pipe, is 1 second.

For example:

Spraying at 3 bars, namely 1.3 L/min with so-called blue nozzles, meeting the standard ISO 10625:2005 identifying the nozzles by their color code.

Surface volume of product A: 0.1 L/ha

Surface volume of product B: 1.5 L/ha

Boom width with all sections opened 44 m and 2 nozzles per meter

Ground speed of the tractor: 15 km/h

Assuming it is desired to spread product B through all the nozzles of the boom:

Preparation of a premixture of 2 L for a surface of 0.2 ha, namely 10 L/ha

Buffer tank 29 preparation of product B

Volume of product B=0.2 ha×1.5 L/ha=0.3 L

Volume of water added=2 L−0.3 L=1.7 L

Buffer tank 30 preparation of product A+B

Volume of product A=0.2 ha×0.1 L/ha=0.02 L

Volume of product B=0.2 ha×1.5 L/ha=0.3 L
Volume of water added=2 L−0.3 L−0.02 L=1.68 L
Treatment with B on the whole boom:
Switching the valves 42 and 43 onto the buffer tank 29
Flow rate of pump 32=10 L/ha×44 m×15 km/h/600=11 L/min
Flow rate of pump 35=0 L/min
Flow rate at the boom=44 m×2 nozzles×1.3 L/min=114.4 L/min
Flow rate of pump 6=114.4 L/min−11 L/min=104.4 L/min If it is desired to slow down the progress of the tractor to 5 km/h (which is impossible with a known type sprayer without changing the nozzles):
The nozzle pressure remains at 3.5 bars, namely 1.3 L/min
Flow rate of pump 32=10 L/ha×44 m×5 km/h/600=3.66 L/min
Flow rate of pump 35=0 L/min
Flow rate at the boom=44 m×2 nozzles×1.3 L/min=114.4 L/min
Flow rate of pump 6=114.4 L/min−3.66 L/min=110.73 L/min If it is desired, at a specific time, to spray product A+B on half of the boom and product B on the other half:
The valve 42 remains directed onto the buffer tank 29 and the valve 43 switches to the buffer tank 30.
Flow rate of pump 32=10 L/ha×22 m×15 km/h/600=5.55 L/min
Flow rate of pump 35=0 L/ha×22 m×15 km/h/600=5.55 L/min
Flow rate at the boom=44 m×2 nozzles×1.3 L/min=114.4 L/min
Flow rate of pump 6=114.4 L/min−11 L/min=104.4 L/min The device of the invention allows the additive products to be metered with very high accuracy, much greater than those of the prior art systems.

Indeed, the accuracy obtained by the device of the invention is less than 1%, and this for any liquid of a viscosity<2000 cps.

The metering performed on the amount of water allows products containing abrasive particles to be metered which greatly increases the reliability of the system compared to the previously proposed systems.

In the case of a product metered at 6 L/ha, a tractor with a 44 m sprayer traveling at 18 km/h requires a flow rate of 6600 mL/min. If it sprays a product at 50 g/ha and at the same time closes part of its boom (in case of spraying at the field plot boundaries) and this boom section is 4 m long and it decreases its speed to 4 km/h, the product of 50 g/ha has a flow rate of 1.3 mL/min. The ratio between these two end values is of 1.3/6600=4950. This ratio represents the dosage scale or range the system should be able to cover. Known systems (namely from prior art) do not allow such a broad range to be covered.

The device of the invention has a metering scale or range much more extensive than that of the prior art. The invention thereby allows all metering requests of a sprayer to be met in any situation.

Known systems use nozzles operating in a spray pressure range between 2 bars and 5 (or 8) bars according to the technology of said nozzles. A sprayer provided with blue nozzles as defined in the standard ISO 10625:2005 for example and which prepared a mixture in a tank for spraying this mixture at 100 L/ha, will spray at 5 bars at 18 km/h and at 2 bars at 12 km/h.

This represents the speed limits that such a known system cannot exceed at the risk of under-metering when it exceeds 18 km/h and over-metering when it drops below 12 km/h. In addition, spraying obtained by this known type of sprayer is not identical at tractor ground speeds of 18 km/h and 12 km/h. In the first case, at 5 bars the jet of the nozzles is a mist formed of very fine droplets, at 2 bars the droplets are much larger. Yet, the effect of the treatment is strongly modified by the droplet size.

On the contrary, the device of the invention allows the amount of the products to be modulated depending on the ground speed while keeping a fixed spraying pressure at the nozzles and thereby to treat with a droplet size that is always the same regardless of the ground speed.

Finally, the known systems do not allow a product or several products to be instantly modulated in the field plot, for example in the case of thistle circles scattered in a field plot or of an anti-*botrytis* treatment on the bunch of grapes. Nowadays it is necessary to pass twice in the field plot, by treating the whole field plot with a mixture and by passing once more in the same field plot to treat the thistle circles or the bunch of grapes.

The device of the invention allows the dosage to be modulated and the additive products to be instantaneously associated at the entire spray boom or a part thereof (<1 second) which cannot be performed by known systems.

Figure 2:
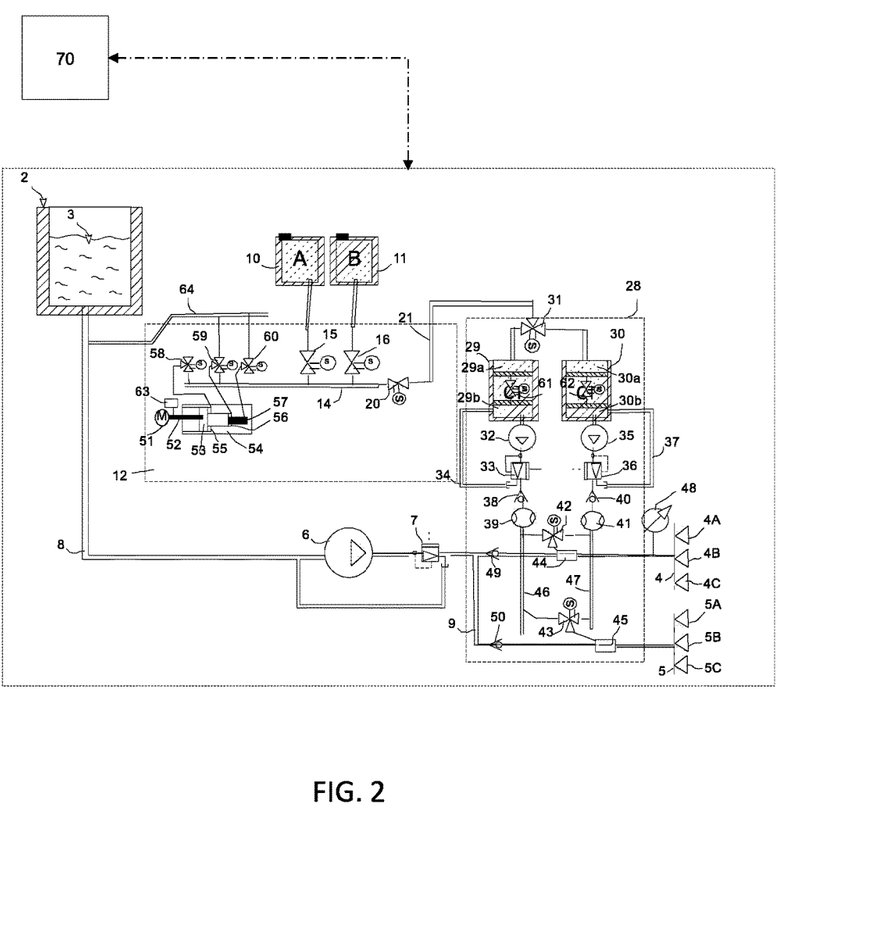
FIG. 2 shows a diagram of a second embodiment of the invention using a multi-stage syringe.

In another embodiment shown in FIG. 2, the means are adapted to carry out the premixture successive batches by a stage syringe.

These means include:
a pipe 64 mounted to bypass the pipe 8 supplying water from the tank 2;
a syringe 54 with stages, in this case three, provided with a piston 53 driven by an electric motor 51. A position sensor 63 of a type known per se, connected to the cylinder 52 of the piston, allows the piston of the syringe to be very precisely positioned. The three chambers 55, 56, 57 of the syringe 54 have different and increasing volumes;
three three-way valves 58, 59, 60: a first way of each valve which is also the common way of the valve, is connected to a chamber 55, 56, 57, respectively, of the syringe; a second way of each valve is connected to an upstream part of the third pipe 14 (upstream of the product tanks 10 and 11); the third way is connected to the downstream part of the pipe 64.

Identically to the dummy piston, these means further include:
additive product tanks 10 and 11 connected in parallel, each at a controlled valve 15 and 16 connected at an injection point to the third pipe 14 between the chamber 13 and upstream of the discharge valve 20.

The motor 51, the three-way valves 58, 59, 60, the valves 15 and 16, the valve 20 and the sensor 63 are connected to a control console, 70, and which includes means adapted to actuate/control these elements, depending on required parameters given by the user.

The operation of the device and the implementation of the process are as follows:
In the starting position, the syringe 54 is empty and the chambers 55, 56, 57 have a volume of almost zero (the piston being pushed to the maximum). The circuit is filled with water. The user controls all the valves to be closed.

Then, the three-way valves 58, 59, 60 are controlled to open, provided that a single three-way valve is open also to the third pipe 14, the other ways being positioned so as to allow the passage of water.

More specifically, the first three-way valve 60 is controlled to open as well as the valve 15, so as to connect the tank 10 to the chamber 57, which is the smallest, while each of the other three-way valves 58 and 59 connects the water tank 2 to a different chamber, 55 and 56.

The motor 51 actuates the piston so as to draw in the first chamber 57 a predetermined given amount of product A contained in the tank 10, the other chambers 55 and 56 filling with water. The translational movement of the cylinder 52 is accurately measured by a sensor 63 of a known type, magnetic or otherwise. The sensor controls the motor 51 depending on the commands and instructions received from the control unit.

When the amount of requested product is absorbed by the syringe, the piston stops, the valve 15 closes and the valve 16 opens to absorb product B. The piston resumes its stroke with a configuration identical to or different from the valves 58, 59, 60 corresponding to the desired dosage of product B.

Once the amount of product B is absorbed, the piston stops, the valve 16 closes and the piston continues its stroke to complete the entire volume of the syringe with water. When at the end of stroke, the chambers contain a premixture batch. Then, the valve 20 opens and the piston is pushed by the motor 51 in the opposite direction (to the right in FIG. 2), for discharging the contents of the three filled chambers towards the buffer tanks 29 or 30 according to the switch of the valve 31.

Thus, for a drawing/discharge cycle, the syringe first draws one or more additive products and water, and then discharges a given amount of aqueous solution containing the amount of product to be spread on a pre-established surface unit as carried out with the dummy piston.

Figure 3:
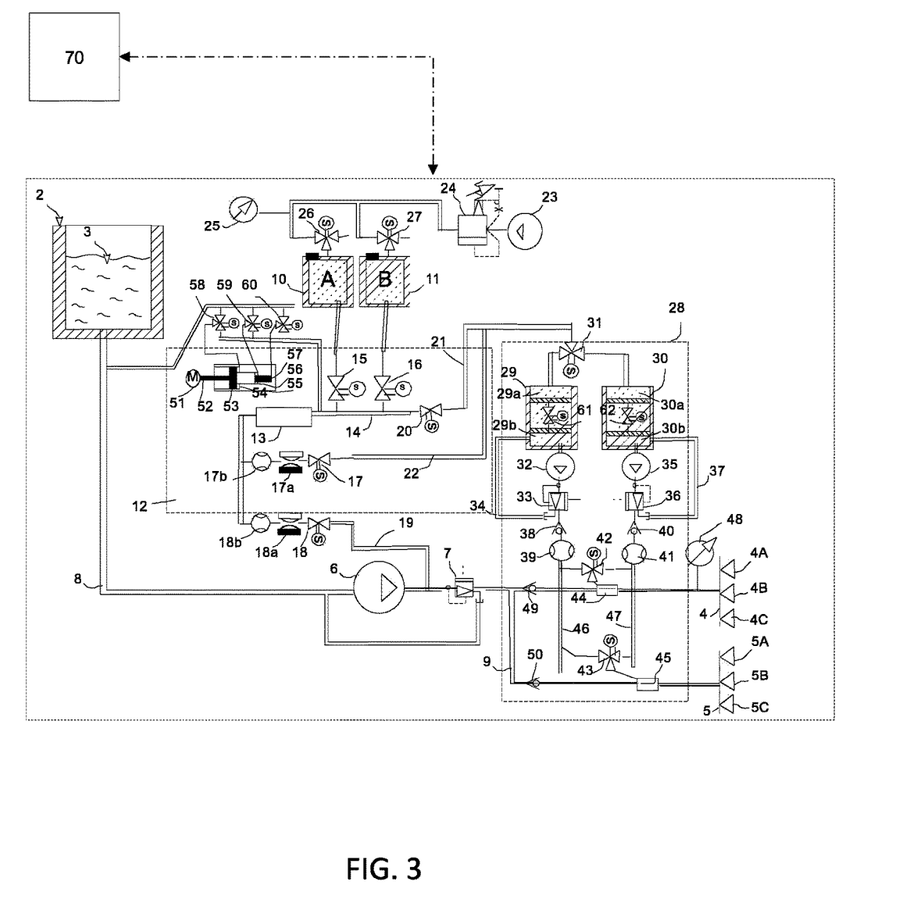
FIG. 3 shows a diagram of a third embodiment including both the "dummy piston" of the device of FIG. 1 and the "stage syringe" of the device of FIG. 2.

In another embodiment shown in FIG. 3, the means adapted to carry out the premixture successive batches are designed from mixing the two techniques shown in FIG. 1 and in FIG. 2.

Metering by "dummy piston" (FIG. 1) and by stage syringe (FIG. 2) are complementary, and it is possible to use for example, the technique of the syringe for small dosages and the technique of the dummy piston for larger dosages of additive products.

In FIG. 3, only the metering module 12 differs from the other figures, which is why the following description only focuses on the means to create this module.

Thus, in a preferred embodiment, the module 12 is comprised of:
- a chamber 13 connected on the upstream side to one or more measuring flow meters 17b on the one hand, and to a water meter flow meter 18b on the other hand, and on the downstream side to a third pipe 14 for discharging the contents of the chamber on which there is a valve called the drain valve 20 for the controlled discharge of the contents of the chamber;
- additive product tanks 10 and 11 connected in parallel, each to a controlled valve 15 and 16 connected at an injection point to the third pipe 14 between the chamber 13 and upstream of the drain valve 20;
- means for precisely controlling the amount of product entering the chamber comprised, for each measuring flow meter 17b placed upstream of the chamber, in series, of a restriction 17a limiting the flow rate in the measuring range of the flow meter to which it is associated, of a valve 17 for obtaining the desired volume, and of a pipe 22 connecting this valve to downstream of the drain valve 20;
- a pipe 64 mounted to bypass the pipe 8 supplying water from the tank 2;
- a syringe 54 with stages, in this case three, provided with a piston 53 driven by an electric motor 51. A position sensor 63 of a type known per se, connected to the cylinder 52 of the piston, allows the piston of the syringe to be very precisely positioned. The three chambers 55, 56, 57 of the syringe 54 have different and increasing volumes;
- three three-way valves 58, 59, 60: a first way of each valve which is also the common way of the valve, is connected to a chamber 55, 56, 57, respectively, of the syringe; a second way of each valve is connected to an upstream part of the third pipe 14 (upstream of the product tanks 10 and 11); the third way is connected to the downstream part of the pipe 64.

Example: a product A at low dosage (e.g., 50 g/ha) and a product B at a higher dosage (e.g., 4 L/ha).

Initially, the valves 15, 16, 20, 17 and 18 are closed, the syringe is empty (piston at the end of its stroke so that the chambers 55, 56, 57 are virtually empty).

The valve 15 opens and the valve 60 is positioned on the side of pipe 14, the valves 58 and 59 are positioned on the side of pipe 14. The motor 51 drives the piston 53 and the chamber 57 is filled with the contents of the pipe 14 and product A enters the pipe 14 with the displaced volume 57, chambers 55 and 56 are filled with water. When the desired volume of product A is reached, the motor 51 stops, the valve 15 closes and the valves 16 and then 17 open, letting product B enter the chamber 13. When the volume of product B accounted for by the flow meter 17b is reached, the valves 17 and then 16 close. The valves 20 and 18 open and simultaneously the motor 51 pushes the piston 53 to completely empty the chambers 55, 56, 57 and the flow meter 18b accounts for the water rinsing chamber 13. When the volume constituting a batch is reached, motor 51 has already stopped, having emptied the chambers of the syringe, and the valves 18 and then 20 close.

A batch containing precisely the desired amount of product A and B has been introduced into the tank 29 or 30 depending on the position of the switching valve 31.

The invention claimed is:

1. A device for preparing one, two or more aqueous solutions intended to be sprayed simultaneously or alternatively, using a spray nozzle boom comprised of several boom sections (4, 5) connected in series or in parallel, on a surface such as a cultivated soil, from a mixture of water and of two, three or more additive products, the device comprising:
   - a main water tank (2);
   - a pump (6) adapted to be connected to each boom section of the spray nozzle boom;
   - a first pipe (8) connecting the water tank (2) to said pump (6);
   - a second pipe (9) dividing into as many parallel branches connecting an outlet of said pump (6) to each boom section of the spray nozzle boom (4,5) and provided at each branch with a check valve (49,50) followed by an injection point (44,45);
   - at least two additive product tanks (10,11), each containing different additive products;
   - means (12) for metering an amount of each additive product to be injected into the second pipe (9) to be mixed with water, wherein said means (12) carry out successive batches of different premixtures of water and additive products, wherein each premixture corresponds to an amount of additive products, and wherein said device comprises two, three or more buffer tanks (29,30) adapted to each receive successive premixture batches, an output of which is connected for each one to a pump (32,35) and then to the injection points (44,45) of the branches of the second pipe (9) in order to be able to supply one or more boom sections with premixture so that these premixtures may be different according to one of more boom sections in which they will be injected on the one hand, that they are dosage-modulated in order to obtain on each boom section an ad hoc concentration of additive products in accordance with a predetermined concentration on the other hand, and finally that, after an addition of water to the different premixtures, a constant spray pressure is obtained on each boom section.

2. The device according to claim 1, characterized in that the amount of additive products contained in a premixture batch corresponds exactly to a desired amount of additive products to be spread on a predefined surface unit, and in that an overall volume of each premixture batch is constant resulted from an addition of an additional volume of water to the volume of additive products introduced.

3. The device according to claim 1, further including means adapted to carry out the premixture successive batches having a "dummy piston" metering system, comprised of:
  a chamber (13) connected on an upstream side to one or more measuring flow meters (17b) on the one hand, and to a water meter flow meter (18b) on the other hand, and on a downstream side to a third pipe (14), for discharging contents of the chamber (13), on which there is a valve called the drain valve (20) for the controlled discharge of the contents of the chamber (13);
  as many controlled valves (15,16) as said at least two additive product tanks (10,11), connected at one end thereto and at the other end at an injection point located at the third pipe (14) between the chamber (13) and upstream of the drain valve (20);
  means for precisely controlling an amount of product entering the chamber (13) comprised, for each measuring flow meter (17b) placed upstream of the chamber, in series, of a restriction (17a) limiting the flow rate in a measuring range of the measuring flow meter (17b) to which it is associated, of a valve (17) for obtaining a desired volume, and of a pipe (22) connecting this valve (17) to downstream of the drain valve (20);
  means for pressurizing contents of the additive product tanks comprised of an air pump (23), of a pressure regulator (24) and of three-way valves (26,27) connected onto each additive product tank (10,11);
  means for discharging the contents of the chamber (13) by a flow which is a reverse of that of its filling when measuring the different additive products comprised, in series, of the water meter flow meter (18b), of a restriction (18a) limiting the flow rate in the measuring range the flow meter (18b), of a two-way valve (18) and of a pipe (19) connecting said two-way valve (18) to downstream of the water pump (6).

4. The device according to claim 3, further including a control console (70), flow meters, manometers and external sensors, all producing data, wherein the regulators (7,24,33,36) and the valves (7,24,33,36) are connected to the control console (70), said control console (70) including means for actuating and controlling regulators (7,24,33,36) and the valves (7,24,33,36), in response to the data from the flow meters, manometers or external sensors.

5. The device according to claim 1, characterized in that each buffer tank is divided into two parts: an upper part (29a, 30a) receiving the premixture being constituted, a second part (29b, 30b) receiving the premixture once completely constituted and in that a two-way valve (61, 62) connects the upper part to a lower part of the buffer tank.

6. The device according to claim 1, characterized in that each buffer tank (29, 30) comprises means for regulating the flow rate of the premixture to be injected into the desired boom sections, said means for regulating the flow rate of the premixture being successively comprised of the pump (32, 35), a regulator (33, 36), including returns (34, 37) which are channeled onto the corresponding buffer tank (29, 30) in order to ensure mixing thereof, a check valve (38, 40), a flow meter (39, 41) and a premixture outlet pipe (46, 47).

7. The device according to claim 1, further including premixture outlet pipes (46,47) and a multiplexer (42,43) which connects premixture outlet pipes (46,47) of the buffer tanks (29,30) to the injection points (44,45) of the branches of the second pipe (9) going to the boom sections (4, 5), and thereby directs, as desired, any premixture onto any boom section (4,5).

8. The device according to claim 7, characterized in that, on the one hand, the flow rate of the pump (32,35) at the outlet of each buffer tank (29,30) is regulated depending on a sprayer ground speed and a number of boom sections connected by a switch of the multiplexer (42,43), and, on the other hand, the pressure of the water pump (6) is regulated in order to ensure a constant pressure at the nozzles of the spray nozzle booms and correct pressure variations due to flow rate changes of the pumps (32,35) at the outlet of the buffer tanks (29,30) when the sprayer speed changes.

9. The device according to claim 8, further including junction points of the second pipe (9), wherein each switch of the multiplexer (42,43), as well as junction points of the second pipe (9), are placed on the corresponding boom section, as close to the nozzles as possible.

10. The device according to claim 1, characterized in that, upstream of the buffer tanks (29,30), a three-way valve (31) in the case of two buffer tanks, or a multiple-way valve in the case of several buffer tanks, directs the premixture batches constituted in one or the other buffer tank.

11. The device according to claim 1, further including a pressure regulator (7), said pressure regulator (7) comprising a return which returns upstream of the pump (6) or, in another embodiment, in the main tank (2), and in that the pressure regulator (7) includes a manometer (48) for measuring a pressure at all boom sections delivered by the pump (6), said pressure being controlled by the regulator (7).

12. The device according to claim 3, characterized in that it comprise an air pump (23), a manometer (25) and a regulator (24) for controlling a pressure of the air pump (23), a first and second 3-way valves (26) and (27) connected, as for a first way, to the additive product tanks (10) and (11), for a second way to an outlet of the regulator (24) and for the last way to the atmospheric pressure.

* * * * *